(12) United States Patent
Xu et al.

(10) Patent No.: US 9,848,366 B2
(45) Date of Patent: Dec. 19, 2017

(54) METHOD FOR DETERMINING RELOCATION PROCESS AND METHOD FOR DETERMINING HANDOVER PROCESS

(75) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 13/822,873

(22) PCT Filed: Sep. 21, 2011

(86) PCT No.: PCT/KR2011/006968
§ 371 (c)(1),
(2), (4) Date: Mar. 13, 2013

(87) PCT Pub. No.: WO2012/039585
PCT Pub. Date: Mar. 29, 2012

(65) Prior Publication Data
US 2013/0176990 A1  Jul. 11, 2013

(30) Foreign Application Priority Data
Sep. 21, 2010  (CN) .......................... 2010 1 0292413

(51) Int. Cl.
*H04W 4/00* (2009.01)
*H04W 36/16* (2009.01)
(Continued)

(52) U.S. Cl.
CPC ......... *H04W 36/165* (2013.01); *H04W 36/00* (2013.01); *H04W 88/16* (2013.01)

(58) Field of Classification Search
USPC ................................................ 370/310–350
See application file for complete search history.

(56) References Cited

U.S. PATENT DOCUMENTS

| | | | |
|---|---|---|---|
| 8,670,432 B2 * | 3/2014 | Luo ........................ | H04B 7/024 370/345 |
| 2008/0043666 A1 | 2/2008 | Tamura et al. | |

(Continued)

FOREIGN PATENT DOCUMENTS

| | | |
|---|---|---|
| CN | 101616481 A | 12/2009 |
| CN | 101754306 A | 6/2010 |
| WO | 2010059100 A1 | 5/2010 |

OTHER PUBLICATIONS

U.S. Appl. No. 61/376,103, Adjakple.*
(Continued)

*Primary Examiner* — Kwang B Yao
(74) *Attorney, Agent, or Firm* — Jefferson IP Law, LLP (57) ABSTRACT

A method for determining relocation process and a method for determining handover process are proposed in the present invention. Wherein the method for determining relocation process includes: informing, by a home base station (HNB) gateway (GW) or an operation, administration and maintenance (OAM) device, the HNB of information of whether the HNB GW supports an optimized relocation process; determining, by the HNB, the relocation process to be implemented for the user equipment (UE) according to the information of whether the HNB GW supports the optimized relocation process. The methods according to the present invention may reduce the failure probability of the relocation/handover and improve the relocation/handover efficiency.

32 Claims, 8 Drawing Sheets

(51) Int. Cl.
*H04W 36/00* (2009.01)
*H04W 88/16* (2009.01)

(56) References Cited

U.S. PATENT DOCUMENTS

| | | | |
|---|---|---|---|
| 2008/0268846 A1 | 10/2008 | Shaheen | |
| 2009/0175240 A1 | 7/2009 | Hayashi | |
| 2009/0257402 A1* | 10/2009 | Zhu | H04W 36/08 370/331 |
| 2009/0265543 A1* | 10/2009 | Khetawat | H04L 63/104 713/151 |
| 2010/0202403 A1 | 8/2010 | Premec | |
| 2010/0208693 A1* | 8/2010 | Centonza | H04W 36/0083 370/331 |
| 2010/0304748 A1* | 12/2010 | Henttonen et al. | 455/436 |
| 2011/0070889 A1* | 3/2011 | Li | 455/436 |
| 2011/0177814 A1* | 7/2011 | Buchmayer | H04L 63/104 455/435.1 |
| 2011/0223919 A1* | 9/2011 | Vikberg | H04W 36/08 455/436 |
| 2011/0228750 A1* | 9/2011 | Tomici | H04L 63/30 370/338 |
| 2011/0237258 A1* | 9/2011 | Nylander | H04J 11/0093 455/437 |
| 2011/0243097 A1* | 10/2011 | Lindqvist | H04W 24/02 370/331 |
| 2011/0256875 A1* | 10/2011 | Edge | H04W 4/02 455/440 |
| 2011/0286429 A1* | 11/2011 | Vikberg et al. | 370/331 |
| 2012/0002608 A1* | 1/2012 | Vesterinen et al. | 370/328 |
| 2012/0002637 A1* | 1/2012 | Adjakple | H04W 36/0055 370/331 |
| 2012/0020346 A1* | 1/2012 | Ganapathy | H04W 36/0033 370/338 |
| 2012/0064903 A1* | 3/2012 | Pani | H04W 36/0088 455/450 |
| 2012/0129497 A1* | 5/2012 | De Benedittis et al. | 455/411 |
| 2012/0147852 A1* | 6/2012 | Ganapathy | H04W 36/0055 370/331 |
| 2012/0250513 A1* | 10/2012 | De Benedittis | H04W 28/18 370/236 |
| 2014/0195655 A1* | 7/2014 | Jha | H04L 61/2575 709/220 |

OTHER PUBLICATIONS

U.S. Appl. No. 61/324,156, Edge.*
R3-091825, Alcatel-Lucent, Support of Inter-Home eNB Mobility.*
WO 2011/159211 A1; Masini.*
Chinese Office Action, Application No. 201010292413.3, dated Dec. 30, 2015.
Alcatel-Lucent, HNB to HNB Handover Procedure Comparison, 3GPP TSG RAN3#65, R3-091512, Aug. 28, 2009, Shenzhen, China.

* cited by examiner

METHOD FOR DETERMINING RELOCATION PROCESS AND METHOD FOR DETERMINING HANDOVER PROCESS

TECHNICAL FIELD

The present invention relates to the mobile communication technology, and particularly to a method for determining relocation process and a method for determining handover process.

BACKGROUND ART

Figure 1:
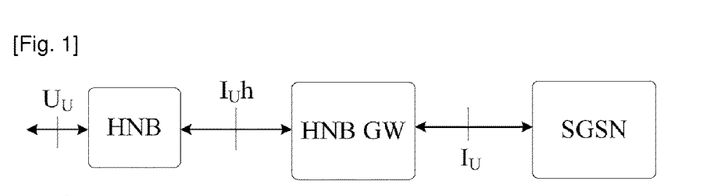
FIG. 1 is a schematic diagram illustrating the connection structure of the HNB in the existing UMTS.

A home base station is a base station used in a home, including the Home evolved Node B (HeNB) and the Home Node B (HNB). The HeNB is a home base station in the Long Term Evolution (LTE) system and the HNB is a home base station in the Universal Mobile Telecommunication System (UMTS). FIG. 1 shows the connection structure of the HNB in the existing UMTS. As shown in FIG. 1, the User Equipment (UE) is connected to the HNB through the Uu interface, the HNB is connected to the home base station gateway (HNB GW) through the Iuh interface, and the HNB GW is connected to the Serving General Packet Radio Service (GPRS) Support Node (SGSN) in the Core Network (CN) through the Iu interface.

The LTE technology is an evolved technology of the third generation (3G) mobile communication system, which is advantageous in that it may improve the cell capacity and reduce the system delay, etc.

Figure 2:
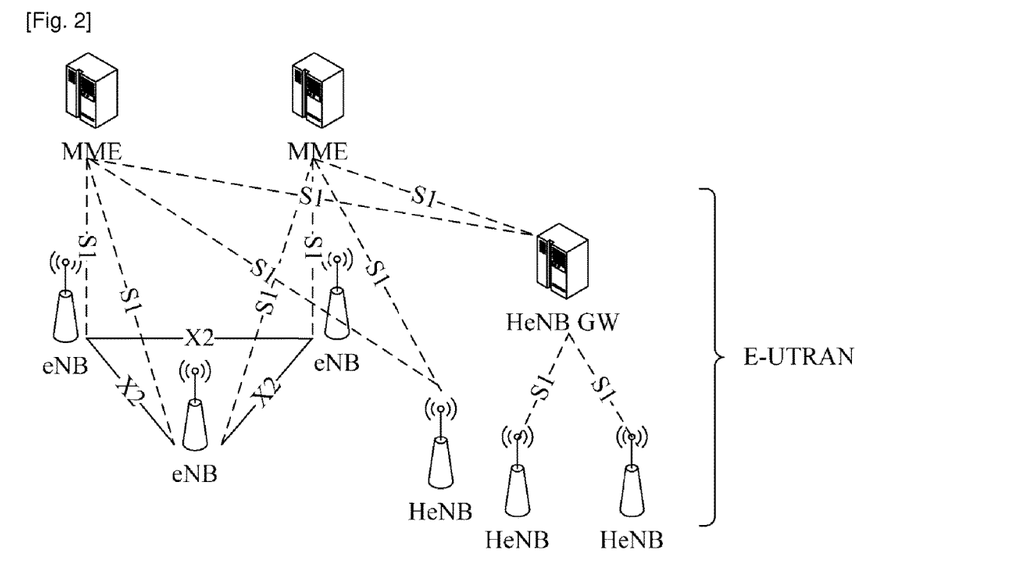
FIG. 2 is a schematic diagram illustrating the construction of the existing LTE system.

FIG. 2 is a schematic diagram illustrating the construction of the existing LTE system. As shown in FIG. 2, the Evolved Universal Terrestrial Radio Access Network (E-UTRAN) of the LET system mainly includes the radio resource management entity, such as the macro base station (eNB) and the home base station (HeNB), etc., and may further include the home base station gateway (HeNB GW). When the HeNB GW is not included, the HeNB may be connected to the Mobile Management Entity (MME) of the core network directly; When the HeNB GW is included, the HeNB is connected to the MME through the HeNB GW. The MME is an important network entity of the core network, realizing the functions of radio access bearer establishing and mobile management, etc.

In order to provide the UE with more access services, there may be many kinds of HNB/HeNB, such as the open HNB/HeNB, the mixed HNB/HeNB and the Closed Subscriber Group (CSG) type HNB/HeNB. Each CSG has CSG identification witch identifies this CSG uniquely. The open HNB/HeNB has no specific limitation to the accessed UE, that is, any UE may access the open HNB/HeNB; the CSG HNB/HeNB only allows the access of the specific UEs (in order to facilitate description, the specific UE is simply referred to as a CSG UE in the following) which is served by the HNB/HeNB; the mixed HNB/HeNB may allow the access of the CSG UE which is served by the HNB/HeNB in order to provide this CSG UE with better quality access services, and at the same time may allow the access of non-CSG UEs.

In the UTMS system, the UE may implement relocation process when moving among HNBs; correspondingly, in the LTE system, the UE may implement handover process when moving among different HeNBs or between the HeNB and eNB. Essentially, both relocation process and handover process are the procedures which are implemented when the UE (in connection mode) moves among different base stations (such as eNB or Radio Network Control entity RNC) or cells. The difference between the two processes only lies in that the particular procedures have little difference when they are applied to different systems. The existing relocation process and handover process also have similar drawbacks, descriptions of which are given as follows.

Figure 3:
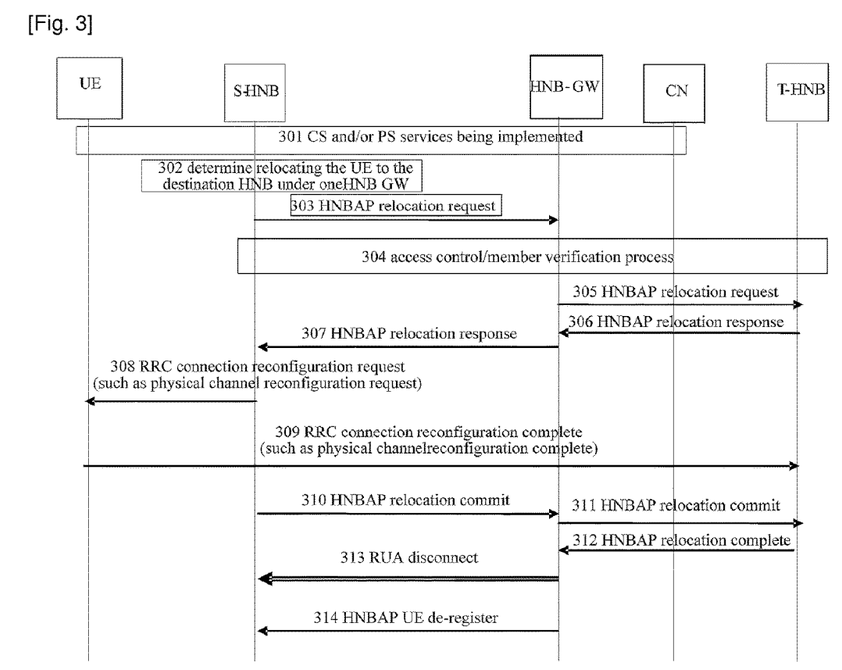
FIG. 3 is a diagram illustrating the optimized relocation process for the UE in the prior art.

Currently, when the UE implements relocation among various HNBs under one HNB GW, the relocation is implemented through the SGSN, which certainly will increase the burden of CN, so as to cause the degradation of the relocation performance. Therefore, a method of relocation for optimizing the UE according to prior art is proposed. Referring to FIG. 3, the method includes the following steps.

Step 301: the UE is connected to the CN through the source (S)-HNB and the HNB GW, the Circuit Switched domain (CS) and/or Packet Switched domain (PS) services between the UE and the CN are activated.

Step 302: the S-HNB decides to perform relocation for the UE in CS and/or PS services currently.

Step 303: the S-HNB determines whether the relocation is performed through the home base station application protocol (HNBAP) or the Radio Access Network Application Part (RANAP) signaling according to information of the HNB neighbor cell. If the S-HNB chooses to trigger the HNBAP relocation process, the HNB sends a HNBAP relocation request message to the HNB GW. The message contains global cell identifications for the source cell and destination cell, UE context and all requisite information all other destination HNBs requests the relocated UE to carry.

Step 304: alternatively, access control or member verification process may be performed to the UE. This step is not an emphasis of the present invention and hereby the detail technical description of which is omitted.

Step 305: the HNB GW transfers the HNBAP relocation request message to the destination (T)-HNB. The HNB GW adds the upstream transport layer parameters to the message. The relocation request message may implement implied UE registration process.

Step 306: the T-HNB sends a HNBAP relocation response message to the HNB GW.

Step 307: the HNB GW transfers the relocation response message to S-HNB.

Step 308: After the HNBAP relocation preparation, the S-HNB starts the RRC reconfiguration process, instructing the UE to move to the destination HNB.

Step 309: the UE sends RRC connection reconfiguration complete message to T-HNB.

Step 310: the S-HNB sends a HNBAP relocation commit message to the HNB GW.

Step 311: the HNB GW transfers the HNBAP relocation commit message to T-HNB.

Step 312: the T-HNB sends a HNBAP relocation complete message to the HNB GW. This message informs the HNB GW that the relocation is completed.

Step 313: the HNB GW sends a RANAP user adaptation (RUA) disconnect message to S-HNB.

Step 314: the HNB GW sends a HNBAP UE de-register message to S-HNB. the S-HNB releases reserved resource to the UE.

The transmission of user plane data between the HNB and the CN may be implemented through one tunnel or two tunnels. One tunnel means that the user plane data is transmitted from the HNB to the CN directly or from the CN to the HNB directly; two tunnels means that the user plane data is transmitted from the HNB to the HNB GW and then to CN, or from the CN to the HNB GW and then to the HNB.

In the LTE, the transmission of user plane data between the HeNB and the CN may be implemented through one tunnel or two tunnels. One tunnel means that the user plane data is transmitted from the HeNB to the S-GW/PDN GW directly or from the 5-GW/PDN GW to the HeNB directly; two tunnels means that the user plane data is transmitted from the HeNB to the HeNB GW and then to the S-GW/PDN GW, or from the S-GW/PDN GW to the HeNB GW and then to the HeNB.

As can be seen from the optimized relocation process shown in the above FIG. 3, the S-HNB determines whether the optimized relocation process (such as HNBAP relocation process) is started, that is the relocation process ending at the HNB GW, or the existing RANAP relocation process is started. The existing RANAP relocation process is described in detail in 3GPP TS23.060, the detailed technical description of which is omitted. If the user plane data is transmitted through one tunnel, when the UE moves from the S-HNB to T-HNB, there is a need for the CN to know the change of the downstream user plane, therefore, HNBAP relocation process may not be used; however, currently, the HNB is incapable of knowing whether the user plane data is transmitted through one tunnel or two tunnels, therefore, the existing relocation process tends to cause the failure of relocation, so as to reduce the relocation efficiency.

Similarly, in the LTE system, there are similar problems when the UE is performing handover between different HeNBs or between the HeNB and eNB. The handover mode may be the original S1 handover or the optimized handover (such as X2 handover). If it is the S1 handover, the S-HeNB sends S1 access protocol (AP) handover request message to the HeNB GW (in the case that there is the HeNB GW deployment); if it is X2 handover, the S-HeNB sends X2AP handover request message to T-HeNB or sends it to T-HeNB through the HeNB GW. If X2 handover also ends at the gateway, the HeNB also needs to know whether the user plane data is transmitted through one tunnel or two tunnels, and at the same time, needs to know whether the HeNB GW supports the X2 protocol. However, currently, the HeNB is unable to know whether the HeNB GW supports the X2 protocol. In addition, when the UE is performing handover from the HeNB to eNB, in the case of choosing to use the mode of performing X2 handover through the HeNB GW, some conditions are required to be satisfied in addition to the need for the HeNB GW to support X2 protocol, for example, there is a X2 interface between the HeNB GW and the destination eNB, and there is a S1 interface between the destination eNB and the MME of UE. However, the existing HeNB does not know the information. Since the HeNB is unable to know the above information, the existing handover process tends to cases the failure of handover, which reduces the handover efficiency.

It can be seen from the above, in the existing relocation/handover process, since it is unable to determine whether the optimized relocation/handover mode may be used according to necessary information, the relocation/handover tends to be failed, which reduces the efficiency.

DISCLOSURE OF INVENTION

Solution to Problem

In view of this, the object of the present invention is to provide a method for determining the relocation process, which can reduce the failure probability of the relocation and improve the relocation efficiently.

The present invention further provides a method for determining the handover process, which can reduce the failure probability of the handover and improve the handover efficiently.

To achieve the above object, the technical solution of the present invention is realized as follows.

A method for determining relocation process includes: informing, by the HNB GW or OAM, the HNB of information of whether the HNB GW supports an optimized relocation process; determining, by the HNB, the relocation process to be implemented for the UE according to the information of whether the HNB GW supports the optimized relocation process.

A method for determining handover process includes: informing, by the HeNB GW or the OAM, the HeNB of information of whether the HeNB GW supports X2 handover; determining, by HeNB, the handover process to be implemented for the UE according to the information of whether the HeNB GW supports X2 handover.

As can be seen, in the method for determining relocation process according to the present invention, the HNB is informed of the information of whether the HNB GW supports the optimized relocation process in advance, and when implementing the relocation process, the HNB may determine whether the optimized relocation process or the original relocation process that is realized through the core network is implemented according to the information of whether the HNB GW supports the optimized relocation process, therefore, unnecessary failure of optimized relocation process is avoided, and relocation efficiency is improved. Similarly, in the method for determining handover process according to the present invention, the HeNB is informed of the information of whether the HeNB GW supports the X2 handover in advance, and when implementing the handover process, the HeNB may determine whether the X2 handover or the original S1 network handover process is implemented according to the information of whether the HeNB GW supports the X2 handover, therefore, unnecessary failure of X2 handover process is avoided, and handover efficiency is improved.

BEST MODE FOR CARRYING OUT THE INVENTION

Figure 4:
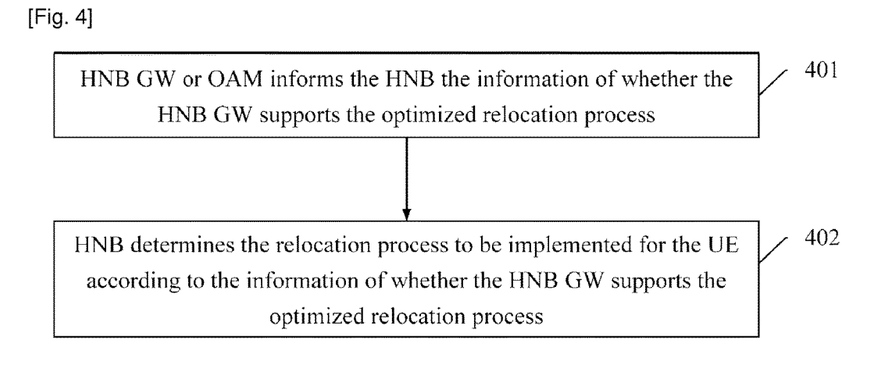
FIG. 4 is a flow chart of a method for determining relocation process according to the present invention.

In view of the problems existing in the prior art, the present invention provides a method for determining relocation process and a method for determining handover process, which may reduce the failure probability of the relocation/handover and improve the relocation/handover efficiency. The solution of the present invention may be realized by the following ways:

A method for determining relocation process. FIG. 4 shows the flow chart of a method for determining relocation process, and the method includes:

Step 401: the HNB GW or the OAM informs the HNB of information of whether the HNB GW supports an optimized relocation process;

Step 402: the HNB determines the relocation process to be implemented for the UE according to the information of whether the HNB GW supports the optimized relocation process.

Figure 5:
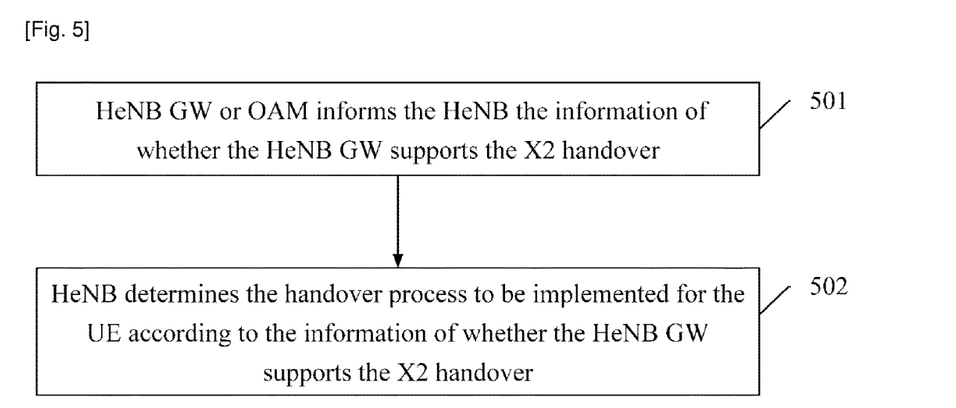
FIG. 5 is a flow chart of a method for determining handover process according to the present invention.

A method for determining handover process. FIG. 5 shows the flow chart of a method for determining handover process, and the method includes:

Step 501: the HeNB GW or the OAM informs the HeNB of information of whether the HeNB GW supports X2 handover;

Step 502: the HeNB determines the handover process to be implemented for the UE according to the information of whether the HeNB GW supports X2 handover.

For more clarity of the technical solution of the present invention, the solution of the present invention will further be described in detail with reference to the figures and embodiments.

It should be noted that in the following embodiments, all the examples will be made in the case of the relocation of UE between the HNBs and handover of UE between HeNBs in the LTE system. Correspondingly, the gateway of the system is the HNB GW or the HeNB GW. In the future, if the eNB also accesses MME through the gateway, or other radio resource management entity accesses the core network through the gateway, the solution described in the present invention is also applicable.

Embodiment 1:

In this embodiment, the HNB GW informs the HNB of the information of whether the HNB GW supports the optimized relocation process through the HNB registration process. Here, the information of whether the HNB GW supports the optimized relocation process may include: 1) information of whether the HNB GW transmits the user plane data through one tunnel or two tunnels, or may include: 2) information of whether the HNB GW supports the HNB application protocol (HNBAP) relocation process, access layer application protocol of the interface between HNB and HNB (HNBRAP) relocation process, or protocol stack between RNC and RNC (Iur protocol).

The information of whether the HNB GW supports the optimized relocation process may include any one or multiple of the above information. In particular, there are three cases as follows:

Case 1: when the information of whether the HNB GW supports the optimized relocation process is the information of whether the HNB GW transmits the user plane data through one tunnel or two tunnels, in the case that the HNB GW transmits the user plane data through one tunnel, the HNB GW does not support the optimized relocation process; in the case that the HNB GW transmits the user plane data through two tunnels, the HNB GW supports the optimized relocation process.

Case 2: when the information of whether the HNB GW supports the optimized relocation process is the information of whether the HNB GW supports HNBAP relocation process, HNBRAP relocation process or Iur protocol, in the case that the HNB GW does not support HNBAP relocation process, HNBRAP relocation process or Iur protocol, the HNB GW does not support the optimized relocation process; in the case that the HNB GW supports HNBAP relocation process, HNBRAP relocation process or Iur protocol, the HNB GW supports the optimized relocation process.

Case 3: when the information of whether the HNB GW supports the optimized relocation process is the information of whether the HNB GW transmits the user plane data through one tunnel or two tunnels and the information of whether the HNB GW supports HNBAP relocation process, HNBRAP relocation process or Iur protocol, in the case that the HNB GW transmits the user plane data through one tunnel or the HNB GW does not support HNBAP relocation process, HNBRAP relocation process or Iur protocol, the HNB GW does not support the optimized relocation process; in the case that the HNB GW transmits the user plane data through two tunnels and the HNB GW supports HNBAP relocation process, HNBRAP relocation process or Iur protocol, the HNB GW supports the optimized relocation process.

Figure 6:
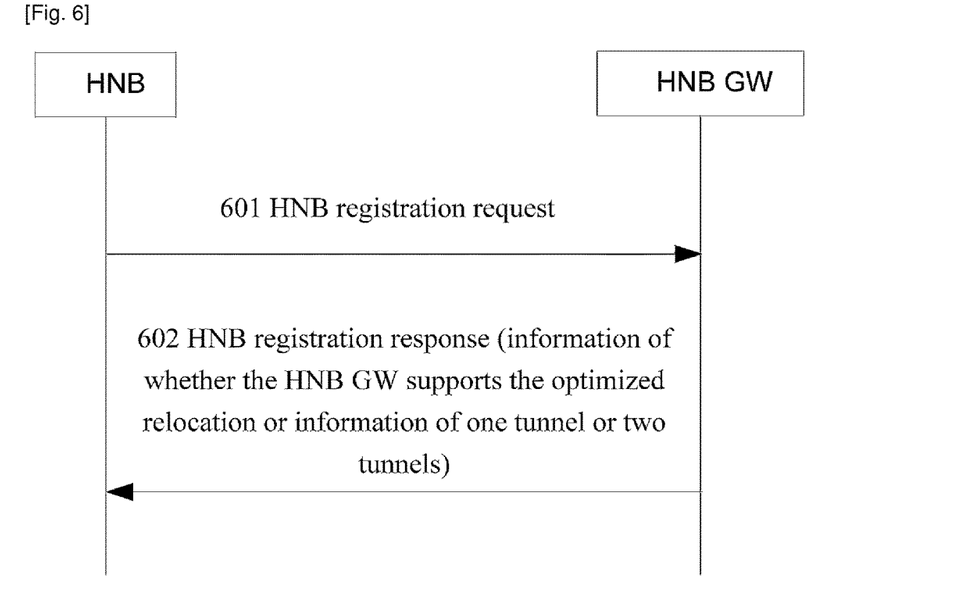
FIG. 6 is a diagram showing the process in which the HNB GW performs informing through the HNB registration process according to the first embodiment of the present invention.

FIG. 6 is a diagram showing the process in which the HNB GW performs informing through HNB registration process according to the first embodiment of the present invention, including the following steps:

Step 601: the HNB sends a HNB registration request message to the HNB GW.

Step 602: the HNB GW sends a HNB registration response message to HNB. The

HNB registration response message contains information of whether the HNB GW supports the optimized relocation process, and in particular, this information may be the information of whether the HNB GW transmits the user plane data through one tunnel or two tunnels; or the information of whether the HNB GW supports HNBAP relocation process, HNBRAP relocation process or Iur protocol.

The HNB stores the above information received from HNB GW.

Embodiment 2:

In this embodiment, operation, administration and maintenance (OAM) device, such as HNB management system (HMS), informs the HNB of the information of whether the HNB GW supports the optimized relocation process. In this embodiment, the information of whether the HNB GW supports the optimized relocation process is the same as that of the embodiment 1.

Figure 7:
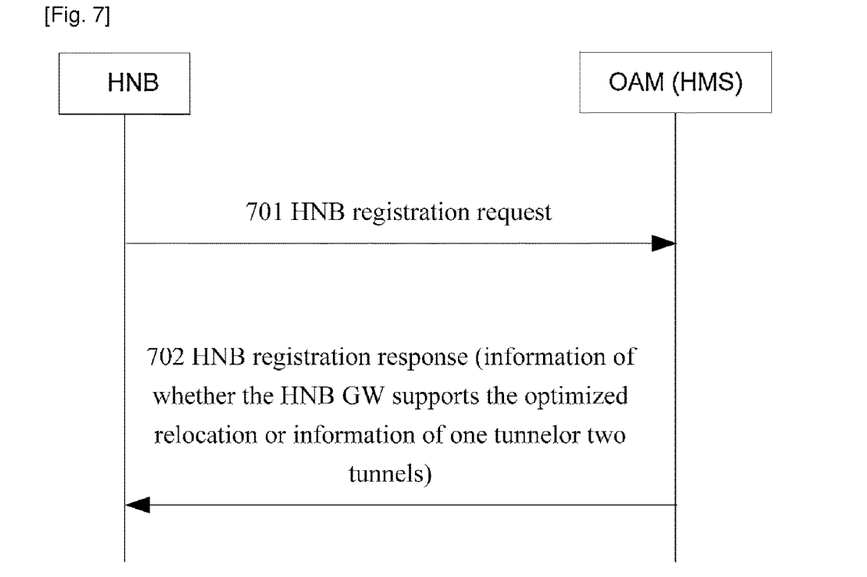
FIG. 7 is a diagram showing the process in which the OAM such as HMS performs informing through the HNB registration process according to the second embodiment of the present invention.

FIG. 7 is a diagram showing the process in which HMS performs informing through HNB registration process according to the second embodiment of the present invention, including the following steps:

Step 701: the HNB sends a HNB registration request message to the OAM entity (such as HeMS).

Step 702: the OAM entity sends a HNB registration response message to HNB. The HNB registration response message contains information of whether the HNB GW supports the optimized relocation process, and in particular, this information may be the information of whether the HNB GW transmits the user plane data through one tunnel or two tunnels; or the information of whether the HNB GW supports HNBAP relocation process, HNBRAP relocation process or Iur protocol. The HNB stores the above information received from OAM.

Embodiment 3;

In this embodiment, the HNB GW informs the HNB of information of whether the HNB GW supports the optimized relocation process through a RUA connection message. In this embodiment, the information of whether the HNB GW supports the optimized relocation process is the same as that of the embodiment 1.

Figure 8:
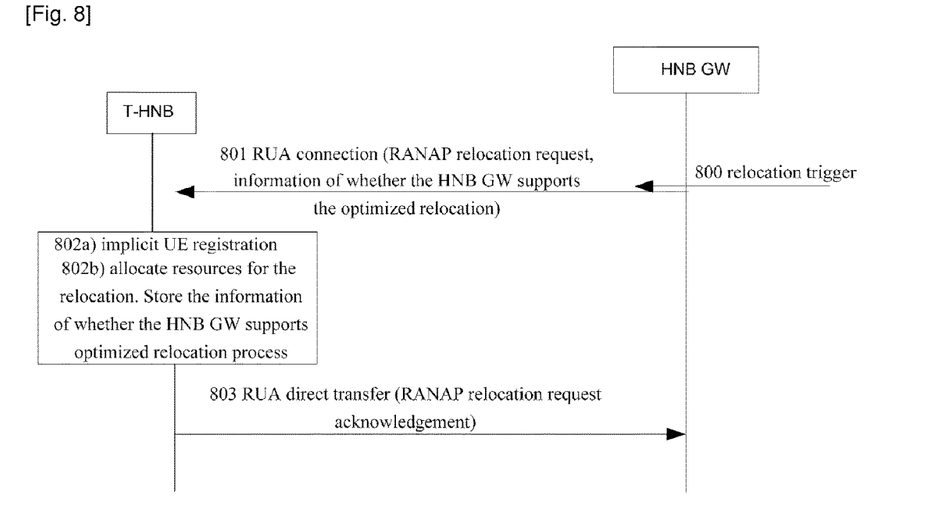
FIG. 8 is a diagram showing the process in which the HNB GW performs informing through RUA connection message according to the third embodiment of the present invention.

FIG. 8 is a diagram showing the process in which the HNB GW performs informing through the RUA connection message according to the third embodiment of the present invention, including the following steps:

Step 800: the HNB GW receives the relocation trigger (such as RANAP relocation request message) of the UE inbound mobility.

Step 801: the HNB GW determines T-HNB, and the HNB GW send the RUA connection message to this T-HNB. The RUA connection message contains RANAP relocation request message, and the RUA connection message contains the information of whether the HNB GW supports optimized relocation process. In particular, this information may be the information of whether the HNB GW transmits the user plane data through one tunnel or two tunnels; or the information of whether the HNB GW supports HNBAP relocation process, HNBRAP relocation process or Iur protocol.

Step 802: 802*a*): the HNB GW and the T-HNB perform the implicit registration. 802*b*): the T-HNB allocates appropriate resources for the relocation. The T-HNB stores the information of whether the HNB GW supports optimized relocation process received in the step 801. If the HNB GW does not support optimized relocation process or the HNB GW uses one-tunnel user plane transmission mode for the UE, the T-HNB implements the existing relocation process performed through the core network when starting the next relocation for the UE (at this time the T-HNB has transformed into S-HNB); If the HNB GW supports optimized relocation process or the HNB GW uses two-tunnel user plane transmission mode for all UEs, the T-HNB may implements the optimized relocation process when starting the next relocation for the UE. For example, if the UE is relocated under one gateway or within one CSG of one gateway, the optimized relocation process is implemented.

Step 803: the T-HNB sends a relocation request acknowledgement massage to the HNB GW through a RUA direct transfer message.

Figure 9:
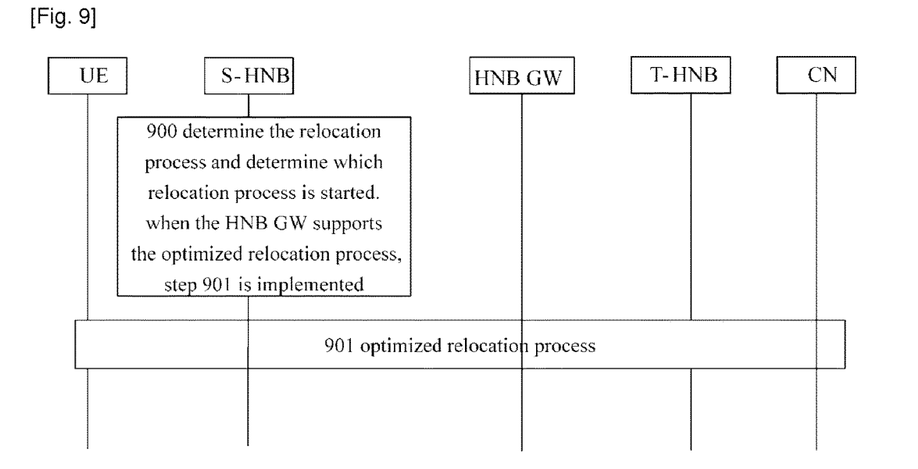
FIG. 9 is a diagram showing the process in which the S-HNB starts the relocation process according to the fourth embodiment of the present invention.

Embodiment 4:

In this embodiment, the S-HNB uses the information obtained from the embodiment 1, embodiment 2 or embodiment 3 to determine which relocation process is used for the UE. FIG. 9 is a diagram showing the process in which the S-HNB starts the relocation process according to the fourth embodiment of the present invention, including the following steps:

Step 900: the S-HNB determines performing the relocation process for the UE. the S-HNB determines whether the optimized relocation process (i.e., the relocation process ending at the gateway) or the existing relocation process performed through the CN is implemented according to the stored information of whether the HNB GW supports the optimized relocation process, or the information of whether the HNB GW transmits the user plane data through one tunnel or two tunnels and other information (for example, whether the UE moves under one HNB GW, or whether the UE moves within one CSG and one HNB GW). For example, when the information stored by the S-HNB is the information of the HNB GW supporting the optimized relocation process or the information of the HNB GW transmitting the user plane data through two tunnels, and the UE moves under one HNB GW or the UE moves within one CSG and one HNB GW, the S-HNB determines implementing the optimized relocation process (i.e., the relocation process ending at the gateway), that is implementing step 901. Otherwise, the existing relocation process performed through the CN is implemented.

Step 901: the S-HNB implements the optimized relocation process.

The emphasis of the present invention is how to use the information from the HNB GW to determine whether the existing relocation process performed through the CN or the optimized relocation process (i.e., the relocation process ending at the gateway) is implemented. The optimized relocation process may be the HNBAP relocation process shown in FIG. 3, or any relocation process mentioned in the R3-101474 of 3GPP RAN3, or other optimized relocation process (such as the HNBRAP relocation process or Iur relocation process). Using which kind of optimized relocation process does not limit the present invention.

Embodiment 5:

In this embodiment, in the case that the S-HNB does not know whether the HNB GW supports the optimized relocation process or whether the HNB GW transmits the user plane data through one tunnel or two tunnels, when the UE moves under one HNB GW or the UE moves within one CSG and one HNB GW, the optimized relocation process may be attempted at first; if the relocation process fails, a relocation process is restarted according to the information obtained from the HNB GW.

Figure 10:
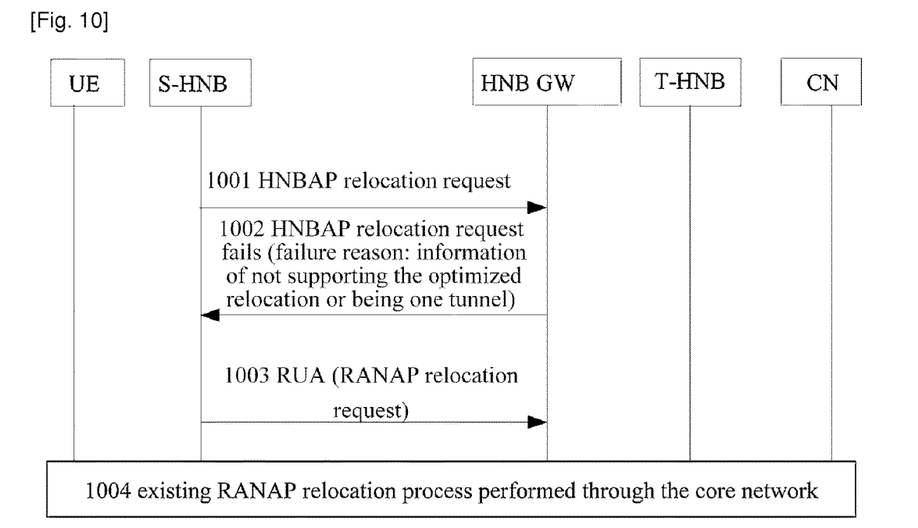
FIG. 10 is a diagram showing the process in which the S-HNB starts the relocation process according to the fifth embodiment of the present invention.

FIG. 10 is a diagram showing the process in which the S-HNB starts the relocation process according to the fifth embodiment of the present invention, including the following steps:

Step 1001: the S-HNB sends a HNBAP relocation request message to the HNB GW.

Step 1002: if the HNB GW does not support the optimized relocation process or the HNB GW transmits the user plane data through one tunnel, the relocation fails, and the HNB GW sends a HNBAP relocation request failure message to S-HNB. The message contains the reason for failure of the relocation, and the value of the reason is set as the information of the HNB GW not supporting the optimized relocation process or the HNB GW transmitting the user plane data through one tunnel. The information of the HNB GW transmitting the user plane data through one tunnel may be the information of the HNB GW transmitting the user plane data of the UE through one tunnel, or the HNB GW transmitting the user plane data of all UEs through one tunnel.

The S-HNB stores the information of the HNB GW not supporting the optimized relocation process or the HNB GW transmitting the user plane data through one tunnel, and the S-HNB starts the existing relocation process performed through the core network according to this information, i.e., proceeds to step 1003. If the information of the HNB GW not supporting the optimized relocation process or the HNB GW transmitting the user plane data through one tunnel is the information of the HNB GW transmitting the user plane data of all UEs through one tunnel, when starting the relocation process for other UEs subsequently, the S-HNB does not start the optimized relocation process, but starts the existing relocation process performed through CN.

Step 1003: the S-HNB sends a RANAP relocation request message to the HNB GW through RUA.

Step 1004: the existing RANAP relocation process performed through the core network is implemented. This step is the same as the prior art and the detailed technical description of which is omitted.

Embodiment 6:

In this embodiment, in the case that the S-HNB does not know whether the HNB GW supports the optimized relocation process or whether the HNB GW transmits the user plane data through one tunnel or two tunnels, when the UE moves under one HNB GW or the UE moves within one CSG and one HNB GW, the optimized relocation process may be attempted at first; if the relocation process fails, a relocation process is restarted according to the information obtained from the HNB GW.

Figure 11:
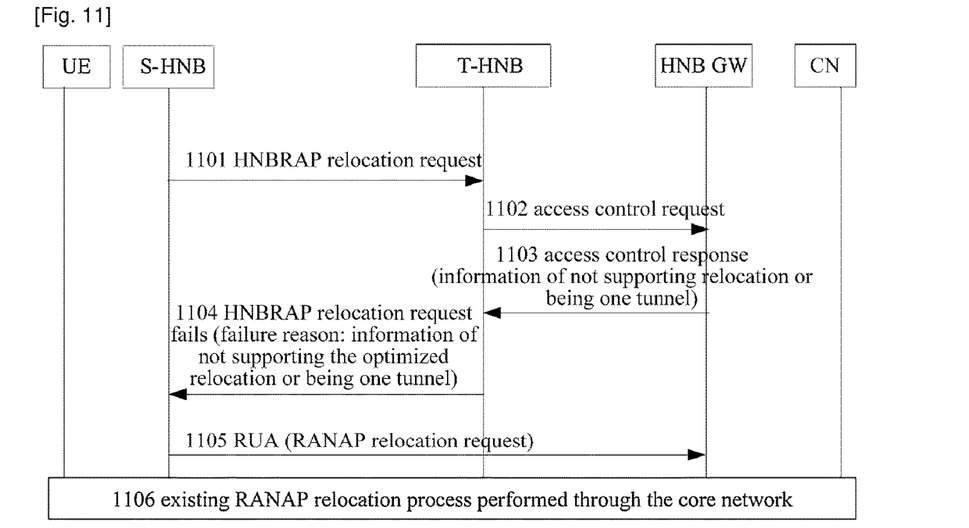
FIG. 11 is a diagram showing the process in which the S-HNB starts the relocation process according to the sixth embodiment of the present invention.

FIG. 11 is a diagram showing the process in which the S-HNB starts the relocation process according to the sixth embodiment of the present invention, including the following steps.

Step 1101: the S-HNB sends a HNBRAP relocation request message to T-HNB.

The T-HNB sends an access control request message to the HNB GW. The message contains a UE identification.

Step 1103: the HNB GW sends an access control response message to T-HNB. If the HNB GW does not support the optimized relocation process or the HNB GW transmits the user plane data through one tunnel, the message contains the information of the HNB GW not supporting the optimized relocation process or the information of the HNB GW transmitting the user plane data through one tunnel. The information of the HNB GW transmitting the user plane data through one tunnel may be the information of the HNB GW transmitting the user plane data of the UE through one tunnel, or the information of the HNB GW transmitting the user plane data of all UEs through one tunnel.

Step 1104: the T-HNB sends a HNBRAP relocation request failure message to S-HNB. The message contains the reason for failure of the relocation, and the value of the reason is set as the information of the HNB GW not supporting the optimized relocation process or the HNB GW transmitting the user plane data through one tunnel. The information of the HNB GW transmitting the user plane data through one tunnel may be the information of the HNB GW transmitting the user plane data of the UE through one tunnel, or the HNB GW transmitting the user plane data of all UEs through one tunnel.

The S-HNB stores the information of the HNB GW not supporting the optimized relocation process or the HNB GW transmitting the user plane data through one tunnel, and starts the existing relocation process performed through the core network according to this information, i.e., proceeds to step 1105. If the information of the HNB GW not supporting the optimized relocation process or the HNB GW transmitting the user plane data through one tunnel is the information of the HNB GW transmitting the user plane data of all UEs through one tunnel, when starting the relocation process for other UEs subsequently, the S-HNB does not start the optimized relocation process, but starts the existing relocation process performed through CN.

Step 1105: the S-HNB sends a RANAP relocation request message to the HNB GW through RUA.

Step 1106: the existing RANAP relocation process performed through the core network is implemented. This step is the same as the prior art and the detailed technical description of which is omitted.

The above embodiments describe the particular methods for the HNB to obtain the information of whether the HNB GW supports the optimized relocation process or whether the HNB GW transmits the user plane data through one tunnel or two tunnels and determine using which relocation process according to the information. In the following embodiments, the particular methods for the HeNB to obtain the information of whether the HNB GW supports the X2 handover and determine using which handover process according to the information will be described.

Figure 12:
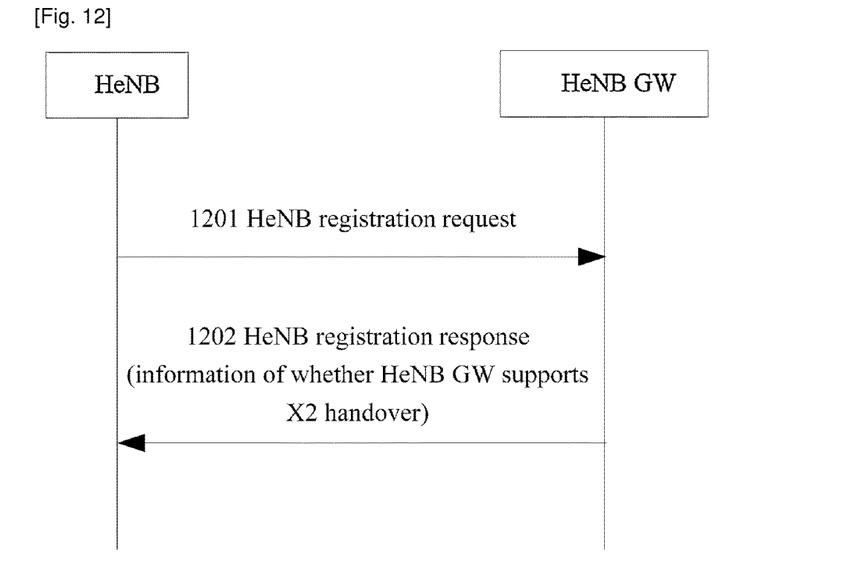
FIG. 12 is a diagram showing the process in which the HeNB GW performs informing through HeNB registration process according to the seventh embodiment of the present invention.

Embodiment 7:

In this embodiment, the HeNB GW informs the HeNB of the information of whether the HeNB GW supports the X2 handover process (i.e., the optimized handover process) through the HeNB registration process. Here, the information of whether the HeNB GW supports the X2 handover process may include: information of whether the HeNB GW supports the X2 protocol, or information of whether the HeNB GW transmits the user plane data through one tunnel or two tunnels. Particularly, when the HeNB GW supports the X2 protocol, or the HeNB GW transmits the user plane data through two tunnels, the HeNB GW supports the X2 handover process; otherwise, the HeNB GW dose not support the X2 handover process FIG. 12 is a diagram showing the process in which the HeNB GW performs informing through HeNB registration process according to the seventh embodiment of the present invention, including the following steps:

Step 1201: the HeNB sends a HeNB registration request message to the HeNB GW.

Step 1202: the HeNB GW sends a HeNB registration response message to HeNB. The HeNB registration response message contains the information of whether the HeNB GW supports the X2 handover process, and in particular, this information may be the information of whether the HeNB GW supports the X2 protocol, or information of whether the HeNB GW transmits the user plane data through one tunnel or two tunnels.

The HeNB stores the above information received from the HeNB GW.

Embodiment Eight:

In this embodiment, OAM, such as the HeNB management system (HeMS), informs the HeNB of the information of whether the HeNB GW supports the X2 handover process (i.e., the optimized handover process). In this embodiment, the information of whether the HeNB GW supports the X2 handover process is the same as that of the embodiment 7.

Figure 13:
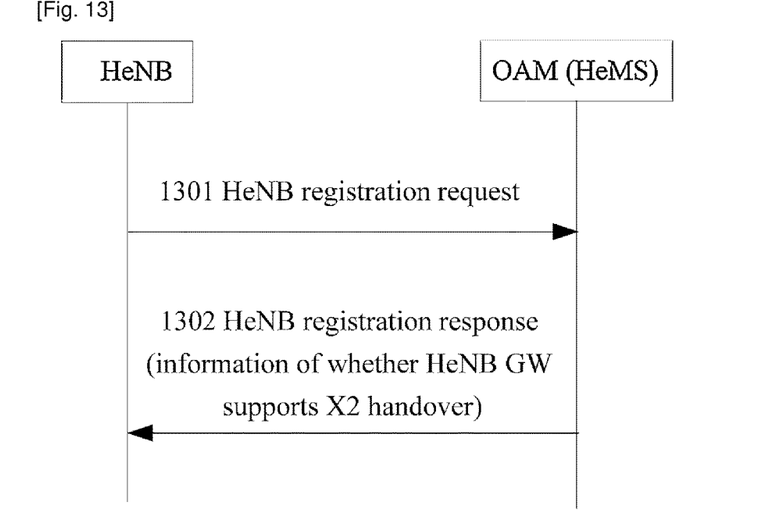
FIG. 13 is a diagram showing the process in which HeMS performs informing through HeNB registration process according to the eighth embodiment of the present invention.

FIG. 13 is a diagram showing the process in which HeMS performs informing through HeNB registration process according to the eighth embodiment of the present invention, including the following steps:

Step 1301: the HeNB sends a HeNB registration request message to the OAM entity (such as HeMS).

Step 1302: the OAM entity sends a HeNB registration response message to HeNB. The HeNB registration response message contains information of whether the HeNB GW supports the X2 handover process, and in particular, this information may be the information of whether the HeNB GW supports the X2 protocol, or the information of whether the HeNB GW transmits the user plane data through one tunnel or two tunnels.

The HeNB stores the above information received from the HeNB GW.

Figure 14:
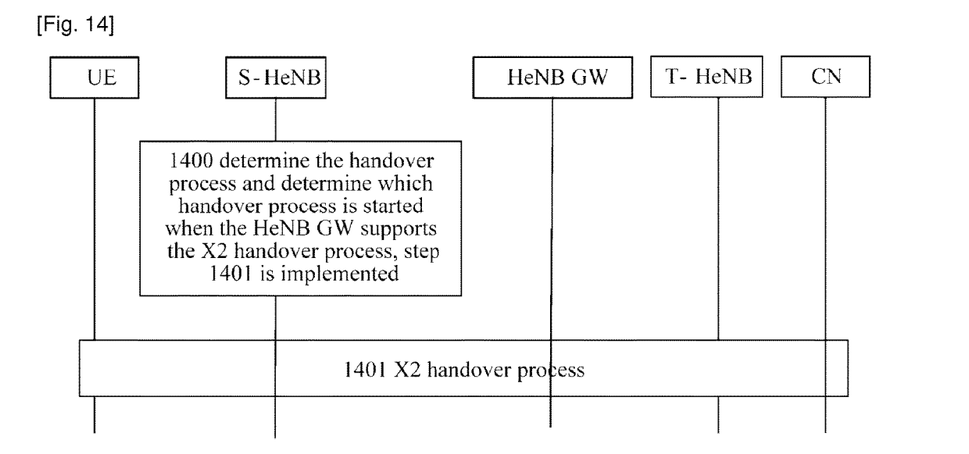
FIG. 14 is a diagram showing the process in which the S-HeNB starts the handover process according to the ninth embodiment of the present invention.

Embodiment 9:

In this embodiment, the S-HeNB determines which handover process is used for the UE according to the information obtained from embodiment 7 or embodiment 8. FIG. 14 is a diagram showing the process in which the S-HeNB starts the handover process according to the ninth embodiment of the present invention, including the following steps:

Step 1400: the S-HeNB determines performing the handover process for the UE. The S-HeNB determines whether the optimized X2 handover process or the existing S1 handover process is implemented according to the stored information of whether the HeNB GW supports the X2 handover process. For example, when the information stored by the S-HeNB is the information of the HeNB GW supporting the X2 handover process, and the UE moves under one HeNB GW or the UE moves within one CSG and one HeNB GW, the S-HeNB determines implementing the X2 handover process, proceeding to step 1401. Otherwise, the existing S1 handover process is implemented.

Step 1401: the S-HeNB implements the X2 handover process.

Embodiment 10:

In this embodiment, in the case that the S-HeNB does not know whether the HeNB GW supports the X2 handover process, when the UE moves under one HeNB GW or the UE moves within one CSG, the X2 handover process may be attempted at first.

Figure 15:
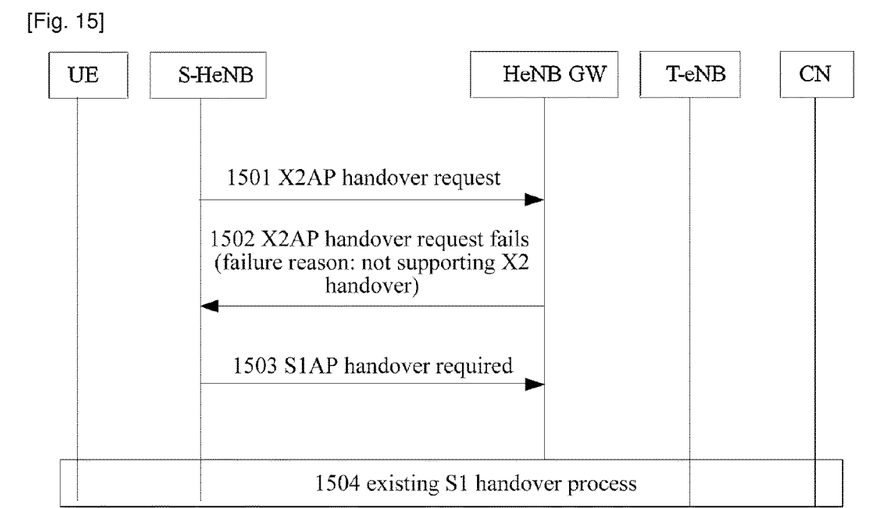
FIG. 15 is a diagram showing the process in which the S-HeNB starts the handover process according to the tenth embodiment of the present invention.

FIG. 15 is a diagram showing the process in which the S-HeNB starts the handover process according to the tenth embodiment of the present invention, including the following steps:

Step 1501: the S-HeNB sends a X2AP handover request message to the HeNB GW.

Step 1502: if the HeNB GW does not support the X2 handover (for example, the HeNB does not support the X2 protocol, there is no X2 interface between the HeNB GW and the destination eNB, or there is no S1 interface between the destination eNB and the source MME of UE), the handover fails, and the HeNB sends a X2 AP handover request failure message to S-HeNB. The message contains the failure reason, and the failure reason is that the HeNB GW does not support the X2 protocol, or there is no X2 interface between the HeNB GW and the destination eNB, or there is no S1 interface between the destination eNB and the source MME of UE, or the HeNB GW transmits the user plane data through one tunnel. The HNB GW transmitting the user plane data through one tunnel may be for the UE or for all UEs.

The S-HeNB stores the information, and determines starting the existing handover process (such as the S1 handover process) according to this information, proceeding to the step 1503.

If the HeNB GW does not support the X2 handover or the HeNB GW transmitting the user plane data through one tunnel is for all UEs, when starting the handover process for other UEs subsequently, the S-HeNB does not start the X2 handover process, but starts the existing handover process performed through the core network (such as the 51 process).

If there is no X2 interface between the HeNB GW and the destination eNB, when starting the handover process to this eNb for other UEs subsequently, the S-HeNB also does not start the X2 handover process, but starts the existing handover process performed through the core network (such as the S1 process).

If there is no S1 interface between the target eNB and the source MME of UE, when starting the handover process for other UEs connected to the MME to the target eNB subsequently, the S-HeNB also does not start the X2 handover process, but starts the existing handover process performed through the core network (such as the S1 process).

Step 1503: the S-HeNB sends the S1AP handover required message to the HeNB GW.

Step 1504: the existing S1 handover process is implemented. This step is the same as the prior art and the detailed technical description of which is omitted.

Embodiment 11:

In this embodiment, in the case that the S-HeNB does not know whether the HeNB

Figure 16:
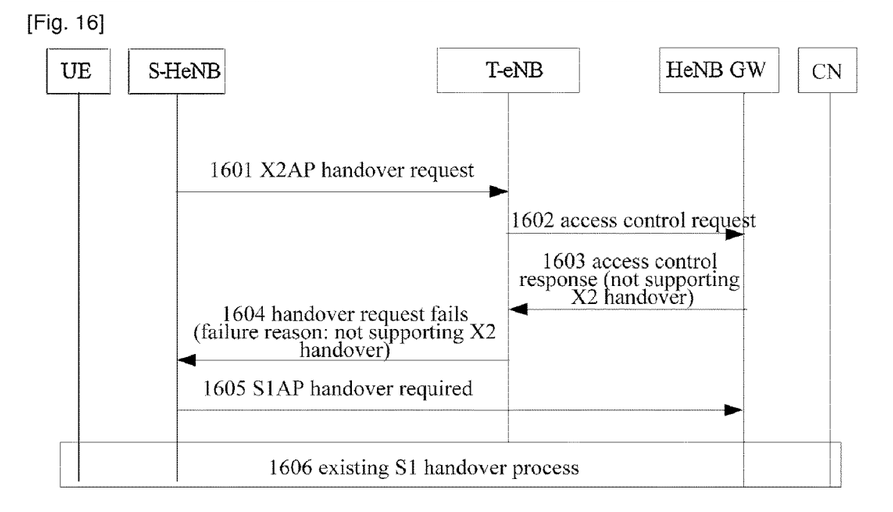
FIG. 16 is a diagram showing the process in which the S-HeNB starts the handover process according to the eleventh embodiment of the present invention.

GW supports the X2 handover process, when the UE moves under one HeNB GW or the UE moves within one CSG, the X2 handover process may be attempted at first. FIG. 16 is a diagram showing the process in which the S-HeNB starts the handover process according to the eleventh embodiment of the present invention, including the following steps:

Step 1601: the S-HeNB sends a X2AP handover request message to T-eNB.

Step 1602: T-eNB sends an access control request message to the HeNB GW.

Step 1603: the HeNB GW sends an access control response message to T-eNB. If the HeNB GW does not support the X2 handover (for example, the HeNB does not support the X2 protocol, or there is no S1 interface between the destination eNB and the source MME of UE), the access control response message contains the information of the HeNB GW not supporting the X2 handover, such as the information of the HeNB not supporting the X2 protocol or no S1 interface between the destination eNB and the source MME of UE; or the information of the HeNB GW transmitting the user plane data through one tunnel. The HeNB GW transmitting the user plane data through one tunnel may be for the UE or for all UEs.

Step 1604: T-eNB sends a handover request failure message to S-HeNB. The message contains the failure reason, and the failure reason is that the HeNB GW does not support the X2 handover, particularly, the HeNB GW does not support the X2 protocol, or there is no S1 interface between the destination eNB and the source MME of UE.

The S-HeNB stores the information, and determines starting the existing handover process (such as the S1 handover process) performed through the core network according to this information, proceeding to the step 1605.

If the HeNB GW does not support the X2 handover or the HeNB GW transmitting the user plane data through one tunnel is for all UEs, when starting the handover process for other UEs subsequently, the S-HeNB also does not start the X2 handover process, but starts the existing handover process performed through the core network (such as the S1 process).

If there is no S1 interface between the target eNB and the source MME of UE, when starting the handover process for other UEs connected to the MME to the target eNB subsequently, the S-HeNB also does not start the X2 handover process, but starts the existing handover process performed through the core network (such as the S1 process).

Step 1605: the S-HeNB sends the S1AP handover required message to the HeNB GW.

Step 1606: the existing S1 handover process is implemented. This step is the same as the prior art and the detailed technical description of which is omitted.

Thus, the description of the solution of the present invention is completed.

It should be noted that in the above embodiments, only the contents relevant to the solution of the present invention is introduced, some contents that have no direct relation with the solution of the present invention and some contents that are relevant to the solution of the present invention but are known to those skilled in the art are not described.

As can be seen from the above embodiments, in the method for determining the relocation process according to the present invention, the information of whether the HNB GW supports the optimized relocation process is obtained by HNB, and whether the optimized relocation process is started is determined according to this information, which can reduce the failure probability of the relocation efficiently and improve the relocation efficiency. In addition, in the method for determining the handover process according to the present invention, the information of whether the HeNB GW supports the X2 handover process is obtained by HeNB, and whether the X2 handover process is started is determined according to this information, which can reduce the failure probability of the handover efficiently and improve the handover efficiency.

The above descriptions are only the preferred embodiments of the present invention and not used as limitation to the present invention. Any modification, equivalent substitution and improvement made within the spirit and principle of the present invention are all included in the protection scope of the present invention.

The invention claimed is:

1. A method for operating a home base station, the method comprising:
    receiving, from a home base station gateway (GW), information indicating whether the home base station GW supports an optimized relocation process through a registration process of the home base station, the optimized relocation process being performed without a core network (CN); and
    starting to perform, in response to receiving the information indicating that the home base station GW supports the optimized relocation process, the optimized relocation process with a target home base station,
    wherein the information comprises at least one of information indicating whether the home base station GW transmits user plane data through one tunnel or two tunnels or information indicating whether the home base station GW supports a home base station application protocol (HNBAP) relocation process, an access layer application protocol of an interface between a home Node B (HNB) and an HNB (HNBRAP) relocation process, or an Iur protocol.

2. The method of claim 1, further comprising:
    starting to perform, in response to receiving the information indicating that the home base station GW does not support the optimized relocation process, an existing relocation process with the target home base station,
    wherein the existing relocation process is performed through the CN.

3. The method of claim 1,
    wherein the starting to perform the optimized relocation process with the target home base station comprises starting to perform, in response to receiving the information indicating that the home base station GW supports the home base station application protocol relocation process, the home base station application protocol relocation process with the target home base station.

4. The method of claim 1,
    wherein the starting to perform the optimized relocation process with the target home base station comprises starting to perform, in response to receiving the information indicating that the home base station GW transmits the user plane data through the two tunnels, the optimized relocation process with the target home base station.

5. The method of claim 1, further comprising:
    transmitting, to the home base station GW, a home base station registration request message,
    wherein the information is received through a home base station registration response message transmitted in response to the home base station registration request message.

6. A method for operating a home evolved node B (HeNB), the method comprising:
    receiving, from an HeNB gateway (GW), information indicating whether the HeNB GW supports an X2 handover process through a registration process of the HeNB, the X2 handover process being performed without a core network (CN); and
    starting to perform, in response to receiving the information indicating that the HeNB GW supports the X2 handover process, the X2 handover process with a target HeNB,
    wherein the information comprises information indicating whether the HeNB GW supports an X2 protocol or information indicating whether the HeNB GW transmits user plane data through one tunnel or two tunnels.

7. The method of claim 6, further comprising:
    starting to perform, in response to receiving the information indicating that the HeNB GW does not support the X2 handover process, an S1 handover process with the target HeNB,
    wherein the S1 handover process is performed through the CN.

8. The method of claim 6,
    wherein the starting to perform the X2 handover process comprises starting to perform, in response to receiving the information indicating that the HeNB GW supports the X2 protocol, the X2 handover process with the target HeNB.

9. The method of claim 6,
    wherein the starting to perform the X2 handover process comprises starting to perform, in response to receiving the information indicating that the HeNB GW transmits the user plane data through the two tunnels, the X2 handover process with the target HeNB.

10. The method of claim 6, further comprising:
transmitting, to the HeNB GW, an HeNB registration request message,
wherein the information is received through an HeNB registration response message transmitted in response to the HeNB registsration request message.

11. A method for operating a home base station gateway (GW), the method comprising:
transmitting, if the home base station GW supports an optimized relocation process, information indicating that the home base station GW supports the optimized relocation process to a home base station for starting to perform the optimized relocation process through a registration process of the home base station,
wherein the optimized relocation process is peformed without a core network (CN), and
wherein the information comprises at least one of information indicating whether the home base station GW transmits user plane data through one tunnel or two tunnels or information indicating whether the home base station GW supports a home base station application protocol (HNBAP) relocation process, an access layer application protocol of an interface between a home Node B (HNB) and an HNB (HNBRAP) relocation process, or an Iur protocol.

12. The method of claim 11, further comprising:
transmitting, if the home base station GW does not support the optimized relocation process, the information indicating that the home base station GW does not support the optimized relocation process to the home base station for starting to perform an existing relocation process,
wherein the existing relocation process is performed through the CN.

13. The method of claim 11, further comprising:
receiving, from the home base station, a home base station registration request message,
wherein the transmitting of the information comprises transmitting the information through a home base station registration response message according to the home base station registration request message.

14. A method for operating a home evolved node B (HeNB) gateway (GW), the method comprising:
transmitting, if the HeNB GW supports an X2 handover process, information indicating that the HeNB GW supports the X2 handover process to an HeNB for starting to perform the X2 handover process through a registration process of the HeNB,
wherein the X2 handover process is performed without a core network (CN), and
wherein the information comprises information indicating whether the HeNB GW supports an X2 protocol or information indicating whether the HeNB GW transmits user plane data through one tunnel or two tunnels.

15. The method of claim 14, further comprising:
transmitting, if the HeNB GW does not support the X2 handover process, the information indicating that the HeNB GW does not support the X2 handover process to the HeNB for starting to perform an S1 handover process,
wherein the S1 handover process is performed through the CN.

16. The method of claim 14, further comprising:
receiving, from the HeNB, an HeNB registration request message,
wherein the transmitting of the informatin comprises transmitting the information through an HeNB registration response message according to the HeNB registration request message.

17. An apparatus of a home base station, the apparatus comprising:
a controller; and
at least one tranceiver operatively coupled with the controller,
wherein the controller is configured to:
receive, from a home base station gateway (GW), information indicating whether the home base station GW supports an optimized relocation process through a registration process of the home base station, and
start to perform, in response to receiving the information indicating that the home base station GW supports the optimized relocation process, the optimized relocation process with a target home base station,
wherein the optimized relocation process is performed without a core network (CN), and
wherein the information comprises at least one of information indicating whether the home base station GW transmits user plane data through one tunnel or two tunnels or information indicating whether the home base station GW supports a home base station application protocol (HNBAP) relocation process, an access layer application protocol of an interface between a home Node B (HNB) and an HNB (HNBRAP) relocation process, or an Iur protocol.

18. The apparatus of claim 17,
wherein the controller is further configured to start to perform, in response to the information indicating that the home base station GW does not support the optimized relocation process, an existing relocation process with the target home base station, and
wherein the existing relocation process is performed through the CN.

19. The apparatus of claim 17,
wherein the controller is further configured to start to perform, in response to receiving the information indicating that the home base station GW supports the home base station application protocol relocation process, the home base station application protocol relocation process with the target home base station.

20. The apparatus of claim 17,
wherein the controller is further configured to start to perform, in response to receiving the information indicating that the home base station GW transmits the user plane data through the two tunnels, the optimized relocation process with the target home base station.

21. The apparatus of claim 17,
wherein the controller is further configured to transmit, to the home base station GW, a home base station registration request message, and
wherein the information is received through a home base station registration response message transmitted in response to the home base station registration request message.

22. An apparatus of a home evolved node B (HeNB), the apparatus comprising:
a controller; and
at least one transceiver operatively coupled with the controller, wherein the controller is configured to:
- receive, from an HeNB gateway (GW), information indicating whether the HeNB GW supports an X2 handover process through a registration process of the HeNB, and
- start to perform, in response to receiving the information indicating that the HeNB GW supports the X2 handover process, the X2 handover process with a target HeNB, wherein the X2 handover process is performed without a core network (CN), and wherein the information comprises information indicating whether the HeNB GW supports an X2 protocol or information indicating whether the HeNB GW transmits user plane data through one tunnel or two tunnels.

23. The apparatus of claim 22,
wherein the controller is further configured to start to perform, in response to receiving the information indicating that the HeNB GW does not support the X2 handover process, an S1 handover process with the target HeNB, and
wherein the S1 handover process is performed through the CN.

24. The apparatus of claim 22,
wherein the controller is further configured to start to perform, in response to receiving the information indicating that the HeNB GW supports the X2 protocol, the X2 handover process with the target HeNB.

25. The apparatus of claim 22,
wherein the controller is further configured to start to perform, in response to receiving the information indicating that the HeNB GW transmits the user plane data through the two tunnels, the X2 handover process with the target HeNB.

26. The apparatus of claim 22,
wherein the controller is further configured to transmit, to the HeNG GW, an HeNB registration request message, and
wherein the information is received through an HeNB registration response message according to the HeNB registration request message.

27. An apparatus of a home base station gateway (GW), the apparatus comprising:
a controller; and
at least one transceiver operatively coupled with the controller,
wherein the controller is configured to transmit, if the home base station GW supports an optimized relocation process, information indicating that the home base station GW supports the optimized relocation process to a home base station for starting to perform the optimized relocation process through a registration process of the home base station,
wherein the optimized relocation process is performed without a core network (CN), and
wherein the information comprises at least one of information indicating whether the home base station GW transmits user plane data through one tunnel or two tunnels or information indicating whether the home base station GW supports a home base station application protocol (HNBAP) relocation process, an access layer application protocol of an interface between a home Node B (HNB) and an HNB (HNBRAP) relocation process, or an Iur protocol.

28. The apparatus of claim 27, wherein the controller is further configured to transmit, if the home base station GW does not support the optimized relocation process, the information indicating that the home base station GW does not support the optimized relocation process to the home base station for starting to perform an existing relocation process,
wherein the existing relocation process is performed through the CN.

29. The apparatus of claim 27, wherein the controller is further configured to:
receive, from the home base station, a home base station registration request message; and
transmit the information through a home base station registration response message according to the home base station registration request message.

30. An apparatus of a home evolved node B (HeNB) gateway, the apparatus comprising:
a controller; and
at least one transceiver operatively coupled with the controller,
wherein the controller is configured to transmit, if the HeNB GW supports an X2 handover process, information indicating that the HeNB GW supports the X2 handover process to an HeNB for starting to perform the X2 handover process through a registration process of the HeNB,
wherein the X2 handover process is performed without a core network (CN) and
wherein the information comprises information indicating whether the HeNB GW supports an X2 protocol or information indicating whether the HeNB GW transmits user plane data through one tunnel or two tunnels.

31. The apparatus of claim 30,
wherein the controller is further configured to transmit, if the HeNB GW does not support the X2 handover process, the information indicating that the HeNB GW does not support the X2 handover process to the HeNB for starting to perform an S1 handover process, and
wherein the S1 handover process is performed through the CN.

32. The apparatus of claim 30, wherein the controller is further configured to:
receive, from the HeNB, an HeNB registration request message, and transmit the information through an HeNB registration response message according to the HeNB registration request message.

* * * * *